(12) United States Patent
Muenzenberger

(10) Patent No.: US 10,641,417 B2
(45) Date of Patent: May 5, 2020

(54) FIRE PROTECTION SLEEVE

(71) Applicant: Hilti Aktiengesellschaft, Schaan (LI)

(72) Inventor: Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/292,429

(22) Filed: Mar. 5, 2019

(65) Prior Publication Data
US 2019/0195395 A1 Jun. 27, 2019

Related U.S. Application Data

(63) Continuation of application No. 15/568,562, filed as application No. PCT/EP2016/059344 on Apr. 27, 2016, now Pat. No. 10,415,725.

(30) Foreign Application Priority Data

Apr. 27, 2015 (EP) .................................... 15165180

(51) Int. Cl.
*F16L 5/04* (2006.01)
*A62C 2/06* (2006.01)
*H02G 3/04* (2006.01)
*H02G 3/22* (2006.01)
*A62C 3/16* (2006.01)

(52) U.S. Cl.
CPC ............... *F16L 5/04* (2013.01); *A62C 2/065* (2013.01); *A62C 3/16* (2013.01); *H02G 3/0412* (2013.01); *H02G 3/22* (2013.01)

(58) Field of Classification Search
CPC ... F16L 5/04; A62C 2/065; A62C 3/16; E04B 1/941; H02G 3/22; H02G 3/0412
See application file for complete search history.

(56) References Cited

U.S. PATENT DOCUMENTS

| 3,369,129 A | 2/1968 | Wolterman |
| 4,109,423 A | 8/1978 | Perrain |
| 4,338,412 A | 7/1982 | von Bonin |
| 4,367,295 A | 1/1983 | von Bonin |
| 4,380,593 A | 4/1983 | von Bonin et al. |
| 4,538,389 A | 9/1985 | Heinen |
| 4,850,385 A | 7/1989 | Harbeke |
| 4,857,364 A | 8/1989 | von Bonin |

(Continued)

FOREIGN PATENT DOCUMENTS

| DE | 30 25 309 A1 | 2/1982 |
| DE | 30 41 731 A1 | 6/1982 |

(Continued)

OTHER PUBLICATIONS

International Search Report for PCT/EP2016/059344, dated Jul. 14, 2016, with English translation.

(Continued)

*Primary Examiner* — Babajide A Demuren
(74) *Attorney, Agent, or Firm* — Grüneberg and Myers PLLC

(57) ABSTRACT

A firestop collar for sealing of openings, especially of line penetrations, that pass-through walls or ceilings, has a frame and a block of optionally intumescent material disposed therein, and is characterized in that an intumescent inlay is disposed between the block and the frame.

10 Claims, 2 Drawing Sheets

(56) References Cited

U.S. PATENT DOCUMENTS

Figure 1:
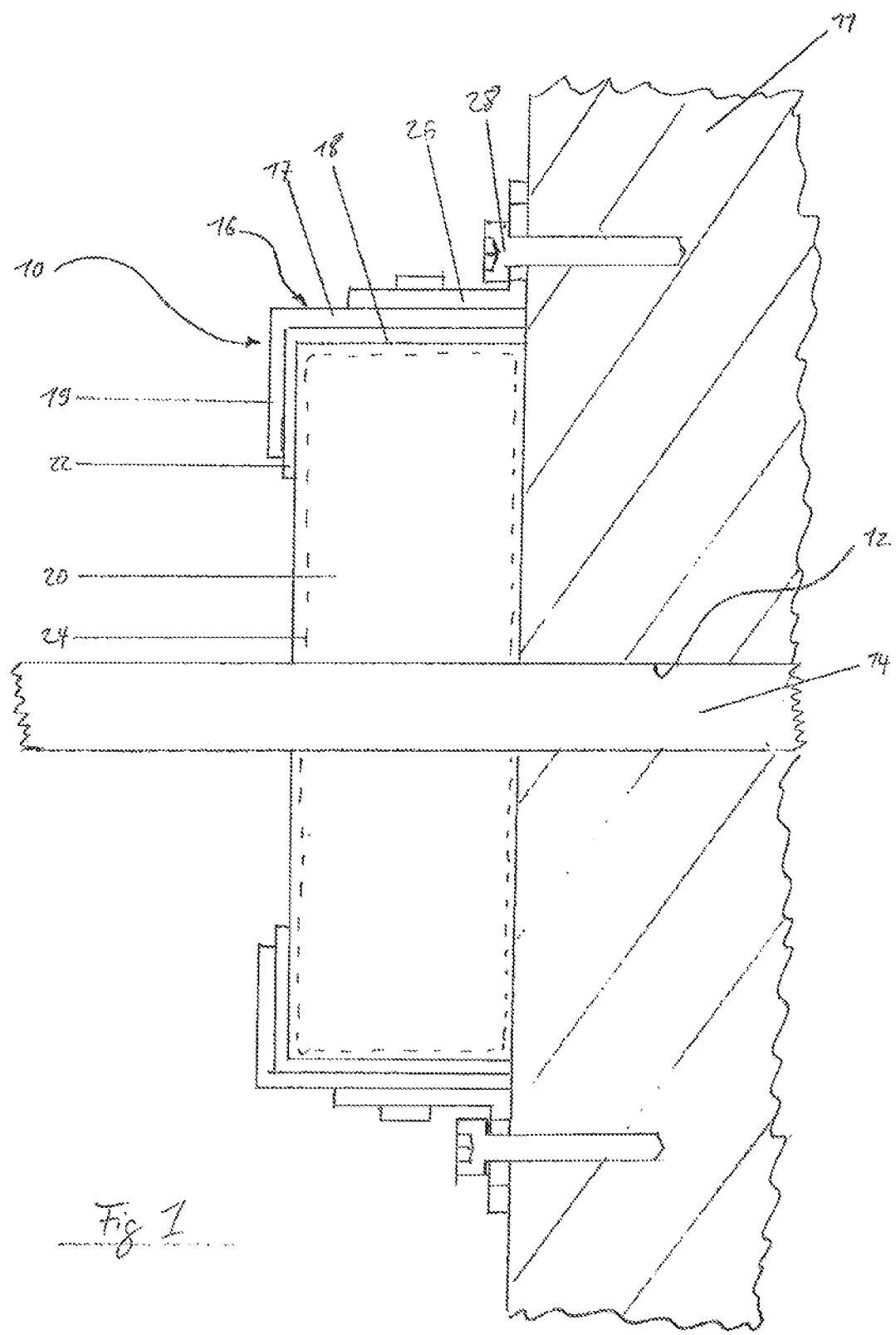

| | | | |
|---|---|---|---|
| 4,916,800 | A | 4/1990 | Harbeke |
| 4,951,442 | A | 8/1990 | Harbeke, Jr. |
| 5,058,341 | A | 10/1991 | Harbeke, Jr. |
| 5,103,609 | A | 4/1992 | Thoreson et al. |
| 5,105,592 | A | 4/1992 | MacMillan et al. |
| 5,173,515 | A | 12/1992 | von Bonin et al. |
| 5,347,767 | A | 9/1994 | Roth |
| 5,452,551 | A | 9/1995 | Charland et al. |
| 5,586,739 | A | 12/1996 | Gantner et al. |
| 5,934,333 | A | 8/1999 | Münzenberger et al. |
| 5,947,159 | A | 9/1999 | Takahashi |
| 5,970,670 | A | 10/1999 | Hoffman |
| 6,029,412 | A | 2/2000 | Gohlke |
| 6,360,502 | B1 | 3/2002 | Stahl, Jr. |
| 6,725,615 | B1 | 4/2004 | Porter |
| 7,596,914 | B2 | 10/2009 | Stahl, Sr. et al. |
| 7,712,791 | B1 | 5/2010 | Whitehead |
| 8,393,121 | B2 | 3/2013 | Beele |
| 9,121,527 | B2 | 9/2015 | Münzenberger et al. |
| 9,220,932 | B2 | 12/2015 | Zernach et al. |
| 9,861,843 | B2 * | 1/2018 | Paetow .............. A62C 2/065 |
| 2004/0030004 | A1 | 2/2004 | Horacek et al. |
| 2004/0149390 | A1 | 8/2004 | Monden et al. |
| 2005/0133242 | A1 | 6/2005 | Kreutz |
| 2006/0160926 | A1 | 7/2006 | Horacek et al. |
| 2011/0180278 | A1 | 7/2011 | Magnay et al. |
| 2012/0207961 | A1 | 8/2012 | Drexl et al. |
| 2013/0086856 | A1 | 4/2013 | Paetow et al. |
| 2013/0161030 | A1 | 6/2013 | Münzenberger et al. |
| 2014/0007373 | A1 | 1/2014 | Münzenberger |
| 2015/0251028 | A1 | 9/2015 | Klein et al. |

FOREIGN PATENT DOCUMENTS

| | | |
|---|---|---|
| DE | 33 02 416 A | 7/1984 |
| DE | 34 11 327 A1 | 10/1985 |
| DE | 39 17 518 A1 | 12/1990 |
| DE | 94 11 293 U1 | 9/1994 |
| DE | 9411293 U1 * | 9/1994 ............. A62C 2/065 |
| DE | 196 53 503 A1 | 6/1998 |
| DE | 20 2004 004 605 | 8/2004 |
| DE | 10 2008 003 120 | 5/2009 |
| DE | 10 2011 089531 A1 | 6/2013 |
| EP | 0 043 952 A2 | 1/1982 |
| EP | 0 051 106 A1 | 5/1982 |
| EP | 0 061 024 A1 | 9/1982 |
| EP | 0 043 952 B1 | 2/1984 |
| EP | 0 116 846 A1 | 8/1984 |
| EP | 0 051 106 B1 | 3/1985 |
| EP | 0 061 024 B1 | 5/1985 |
| EP | 0 158 165 A1 | 10/1985 |
| EP | 0 116 846 B1 | 9/1987 |
| EP | 0 274 068 A2 | 7/1988 |
| EP | 0 158 165 B1 | 1/1989 |
| EP | 0 982 522 | 3/2000 |
| EP | 1 347 549 A1 | 9/2003 |
| EP | 1 641 895 B1 | 6/2009 |
| EP | 2 455 135 A2 | 5/2012 |
| RU | 2 297 500 | 4/2007 |
| WO | 1991/019540 A1 | 12/1991 |
| WO | 97/08485 | 3/1997 |
| WO | 99/58199 | 11/1999 |
| WO | 2013/160776 | 10/2013 |

OTHER PUBLICATIONS

Written Opinion of the International Searching Authority for PCT/EP2016/059344, dated Jul. 14, 2016, with English translation.
International Preliminary Report on Patentability dated Oct. 31, 2017.

* cited by examiner

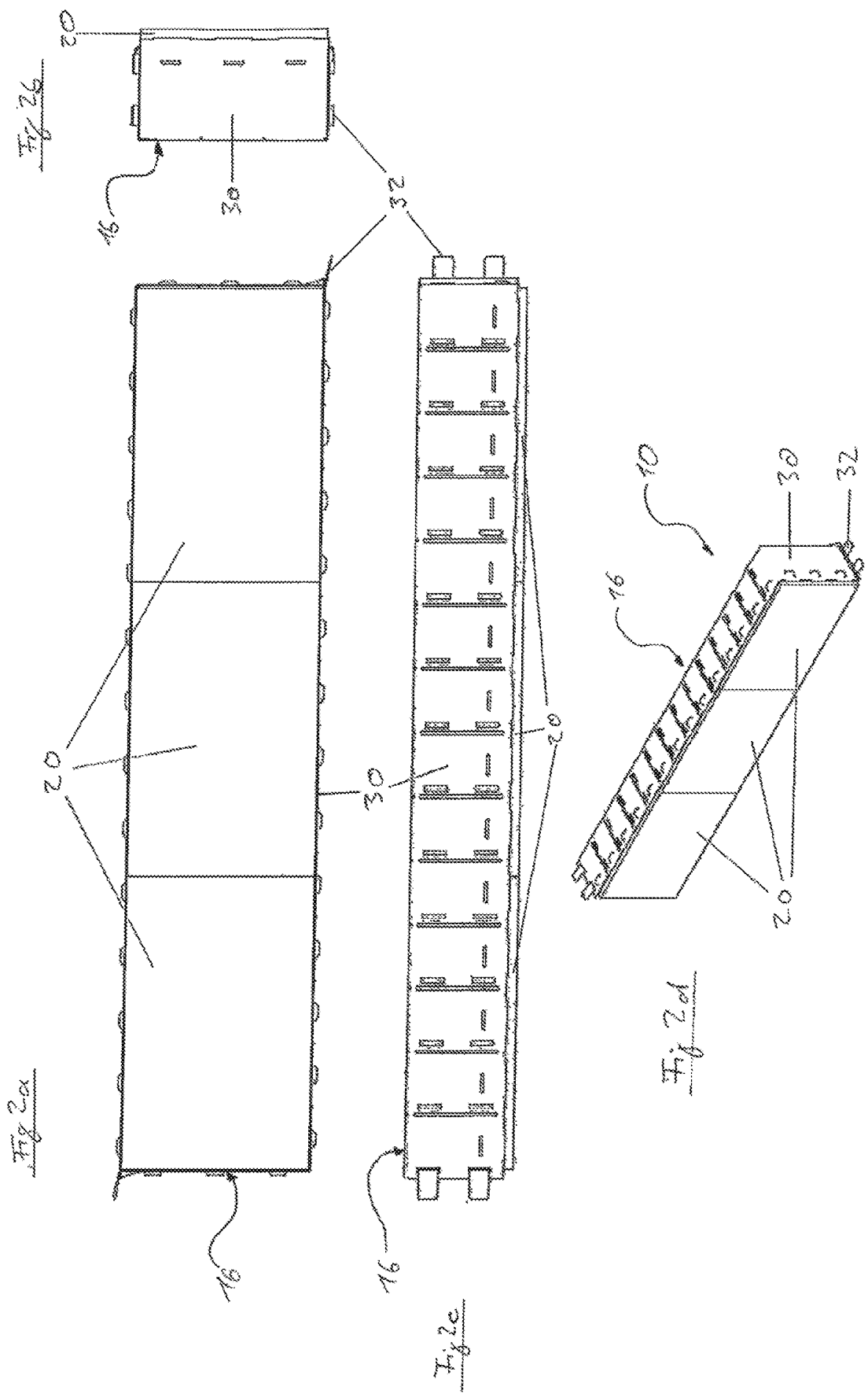

FIRE PROTECTION SLEEVE

This application is a continuation of U.S. Application Ser. No. 15/568,562, filed on Oct. 23, 2017, which was the National Stage entry under § 371 of International Application No. PCT/EP2016/059344, filed on Apr. 27, 2016, and which claims the benefit of European Application No. 15165180.9, filed on Apr. 27, 2015, all of which are incorporated in their entireties by reference.

The invention relates to a firestop collar for sealing of openings, especially of line penetrations, that pass through walls or ceilings, with a frame and a block of optionally intumescent material disposed therein.

Firestop collars, which are capable of sealing line penetrations of non-fire-resistant pipes or cables in ceilings or walls in the event of fire, in order to prevent the spread of fire and smoke in buildings, are known in the most diverse configurations. The firestop collars usually contain an intumescent material, which is disposed around the lines, and a frame of sheet metal, which jackets the intumescent material and serves to fasten the intumescent material to walls or ceilings. The firestop collars are usually attached around the penetrating lines upstream from the openings, since mounting is simpler there.

As an example, DE 10 2011 089 531 A1 discloses a firestop collar of the type mentioned in the introduction, consisting of a block of intumescent material and a frame surrounding this.

EP 2 455 135 A2 teaches a fire-protection element which, in addition to the intumescent material, has a reinforcing inlay, which stabilizes the ash layer formed in the event of fire.

A disadvantage of the known firestop collars is that they are suitable only for small opening cross sections, because in the case of large cross sections the fire-protection element becomes unstable and the ash crust is able to fall out of the frame. This leads to much poorer fire-protection properties and therefore makes known firestop collars unsuitable for large opening cross sections. The object of the invention is to provide a firestop collar that ensures reliable fire protection even in the case of larger opening cross sections.

To solve this object, it is provided, in a firestop collar of the type mentioned in the introduction, that an intumescent inlay is disposed between block and the frame.

In the event of fire, the heat causes the intumescent inlay to be activated and to expand. Preferably the block consists of intumescent material, so that, by using, for the intumescent inlay and the block of optionally intumescent material, various intumescent materials with different properties, for example with respect to activation temperature and expansion behavior, the pressure variations can be adapted in such a way over the duration of the fire that the stability of the resulting ash crust of the optionally intumescent block is improved. These features make it possible to cover much larger opening cross sections with this firestop collar, without causing the stability problems known from the prior art to occur. In particular, opening sizes ranging from 100 mm×300 mm up to 150 mm×750 mm can be sealed with the inventive firestop collar.

The frame of the firestop collar may have a plurality of side portions that surround the block of optionally intumescent material on its side rims, as well as a plurality of front portions extending perpendicularly relative to the side portions. This configuration of the frame ensures that the block of optionally intumescent material is securely fastened and in the event of fire expands directionally, in order to bring its fire-protection properties optimally into effect.

The height of the block of optionally intumescent material is preferably slightly greater than the height of the side portions. Hereby the firestop collar has a projecting length of optionally intumescent material on the wall side, and so this is pressed with preload against the surface of the wall or ceiling during mounting. Preferably, this projecting length is 2 mm to 6 mm, which leads to an optimum contact pressure effect.

In a preferred embodiment, the intumescent inner liner extends along at least one of the side portions. Alternatively, the intumescent inlay may also extend additionally, even along the front portion allocated to the side portion. Due to this configuration, the active forces that the intumescent inlay exerts on the block of optionally intumescent material are advantageously directed, namely toward the interior and toward the wall or ceiling.

In one embodiment, the block consists of a foamable material. Hereby sound absorption is also ensured in addition to imperviousness to smoke gas. In one preferred embodiment, the block consists of a foamable binding agent, which contains at least one ash-forming and optionally intumescent mixture. This binding agent acts as a composite-forming carrier for the ash-forming and optionally intumescent mixture. Preferably, the mixture is distributed homogeneously in the binding agent. The composite-forming carrier is preferably chosen from the group consisting of polyurethanes, phenol resins, polystyrenes, polyolefins such as polyethylene and/or polybutylene, melamine resins, melamine resin foams, synthetic or natural rubber, cellulose, elastomers and mixtures thereof, wherein polyurethanes are preferred.

The ash-forming and optionally intumescent mixture comprises the fire-protection additives that are common and known to the person skilled in the art and that foam up in the event of fire, i.e. under the effect of heat, and while doing so form a foam, such as an intumescent material on the basis of an acid-forming agent, a carbon-producing compound and a blowing agent, that prevents the spread of flames.

Preferably the intumescent material comprises, as acid-forming agent, a salt or an ester of an inorganic, nonvolatile acid chosen from among sulfuric acid, phosphoric acid and boric acid, as carbon-producing compound, a polyhydroxy compound and/or a thermoplastic or thermosetting polymeric resin binding agent, and, as blowing agent, a chloroparaffin, melamine, a melamine compound, especially melamine cyanurate, melamine phosphate, melamine polyphosphate, tris(hydroxyethyl)cyanurate, cyanamide, dicyanamide, dicyandiamide, biguanidine and/or a guanidine salt, especially guanidine phosphate or guanidine sulfate.

The composite-forming carrier may further contain, as ablative additive, an inorganic compound, which has incorporated water, e.g. as water of crystallization, and does not dry out at temperatures up to 100° C. but releases the water starting at 120° C. in the event of fire and thereby is able to cool temperature-conducting parts, wherein the said compound is preferably an inorganic hydroxide or hydrate, especially aluminum hydroxide, aluminum oxide hydrates or partly hydrated aluminum hydroxides, which release water at fire temperature or when exposed to flames. Other inorganic hydroxides or hydrates that release water when exposed to flames may also be considered, however, such as are described in EP 0 274 068 A2.

Such compounds, which may be used as the mixture in the inventive fire-protection inlay, are known to the person skilled in the art and, for example, are disclosed in the following publications, to which reference is expressly made herewith: DE 30 25 309 A1, DE 30 41 731 A1. DE 33 02 416

A1, DE 34 11 327 A1. EP 0 043 952 B1, EP 0 051 106 B1, EP 0 061 024 81, EP 0 116 846 B1, EP 0 158 165 81, EP 0 274 068 A2, EP 1 347 549 A1, EP 1 641 895 B1 and DE 196 53 503 A1.

The molded block is produced by foam molding, such as reaction injection molding (RIM) with foam, corresponding to DE 3917518, e.g. with Fomox® fire-protection foam or with HILTI CP 65GN, a construction material that forms an insulating layer. Materials that can be used for inventive purposes are known from EP 0061024 A1, EP 0051106 A1, EP 0043952 A1, EP 0158165 A1, EP 0116846 A1 and U.S. Pat. No. 3,396,129 A as well as EP 1347549 A1. Preferably, the molded block consists of an intumescent-capable polyurethane foam, such as is known from EP 0061024 A1, DE 3025309 A1, DE 3041731 A1, DE 3302416 A and DE 3411 327 A1.

The block of optionally intumescent material is preferably provided with a reinforcing inlay. This reinforcing inlay serves for stabilization of the intumescent crust formed in the event of fire, and it helps to prevent parts of this from falling out of the firestop collar. For this purpose, it is advantageous to position the reinforcing inlay in the surface of the block of optionally intumescent material, in order to stabilize the outer faces.

The reinforcing inlay is preferably formed by a mat, a mesh or a fabric. Such a construction offers good penetration of the block of optionally intumescent material, and the reinforcing inlay retains its stabilizing properties even if structural damage is sporadically present.

In a preferred embodiment, the reinforcing inlay consists of a temperature-resistant material, for example metal, glass fibers, basalt fibers, carbon fibers or ceramic fibers. A hybrid structure comprising several materials in the reinforcing inlay is also possible. The higher temperature resistance compared with the intumescent material is advantageous, since the reinforcing inlay is not impaired by the temperature that activates the intumescent material and so is able to exert its stabilizing function in this way.

In a further preferred embodiment, the reinforcing inlay consists of expanded metal. This is advantageous with respect to the stabilizing effect.

The firestop collar is preferably fastened by means of a plurality of fastening brackets on its side portions. These permit secure fastening of the firestop collar to walls and ceilings and, for example, they can be joined to the side portions via plug-type means. For fastening, the firestop collar may be placed directly on the wall. An additional frame is not necessary, nor is double framing. It is also possible to mount the firestop collar directly over an already present firewall, so that it acts as a repair wall.

In a preferred embodiment, the block of optionally intumescent material of the firestop collar is a molded part and is inserted in one or more pieces into the frame and is built-in together therewith. The molded parts may have any desired shape, but are preferably regular polyhedra, for example cuboids. This has the advantage that the number of blocks used for the firestop collar can be matched easily to the opening to be sealed. The reduction of the molded parts to a few modular common parts offers further advantages beyond this from the logistical and economic perspective.

In an alternative embodiment, the firestop collar is formed by first mounting the frame and then introducing the block of optionally intumescent material by means of a foam material with optionally intumescent properties, wherein the foam material is a foamable material, such as an in-situ foam, for example, that is introduced into the frame and then fills it by foaming up. The advantage of this approach is that only the foam material instead of molded parts has to be kept in readiness, and an individually adapted block of optionally intumescent material is obtained automatically by foaming the frame in place.

In a preferred embodiment, the frame of the firestop collar is of modular construction. This means in particular that this is constructed from a few common parts and can be configured in diverse ways. This has the advantage that the frame can be adapted individually in place to the opening cross section and that efficient use of material is possible. In addition, a reduction of the parts from which the frame is constructed to a few modular common parts offers further advantages beyond this from the logistical and economic perspective.

Preferably, the frame of the firestop collar consists of a plurality of individual parts, which are joined to one another by a plug-type connector. Thus, when the frame is dismantled into individual parts, it may be transported in compact form and mounted simply by the plug-type connectors.

In a further embodiment, the frame of the firestop collar is formed from one continuous strip, which is cut to the desired length and the end of which is joined to its beginning. In this way, the frame can be adapted individually to various opening cross sections.

Further advantages and features will become obvious from the description hereinafter in conjunction with the attached drawings, wherein:

FIG. 1 shows a sectional view of a first embodiment of the inventive firestop collar, which has been attached upstream from a line penetration, FIG. 2a shows, in a top view in the direction of the face bearing on the wall, a firestop collar with a frame of modular construction according to a second embodiment of the invention, FIG. 2b shows a first side view, FIG. 2c shows a second side view, and FIG. 2d shows a perspective view of the second embodiment of the inventive firestop collar.

FIG. 1 shows a first embodiment of a firestop collar 10, which is attached at an opening, e.g. in a wall 11, upstream from a line penetration 12 of a line 14. The firestop collar contains a frame 16, a block 20 of optionally intumescent material located therein and an intumescent inlay 22 disposed therebetween, and is joined to wall 11 via fastening brackets 26. As an example, line 14 is a water pipe of plastic or contains one or more cables.

Frame 16 has a plurality of side portions 17, which surround block 20 on its side rims 18 and relative to which a plurality of front portions 19 extends perpendicularly.

On the side facing away from block 20, a plurality of fastening brackets 26 is provided on these side portions 17.

Block 20 has a reinforcing inlay 24, which preferably is integrated into the outer surface of block 20. The reinforcing inlay 24 may be formed by a mat, a mesh or a fabric.

Preferably, reinforcing inlay 24 consists of particularly temperature-resistant material, such as metal, glass fibers, basalt fibers, carbon fibers, ceramic fibers or a hybrid material, for example.

Alternatively, expanded metal may be used for reinforcing inlay 24.

Block 20 may be provided as a molded part, for example in the form of a cuboid. In this case, block 20 is preferably slightly larger than frame 16 surrounding it, in order to guarantee secure seating of block 20 in frame 16. In particular, block 20 is 2 mm to 6 mm higher than side portions 17, and, by virtue of this projecting length toward the wall side, it may be mounted in such a way on wall 11 that the intumescent material is pressed with preload against the surface.

Alternatively, block 20 may also be formed by a foam material introduced into frame 16. For this purpose, frame 16 including intumescent inlay 22 is first fastened upstream from line penetration 12 and then the space surrounded by frame 16 is filled by injection molding with an intumescent foam material. Depending on configuration, reinforcing inlay 24 may be introduced at various points in time.

Intumescent inlay 22 is fixed between frame 16 and block 20 and extends along side portions 17 and the respective front portions 19.

Fastening brackets 26, which consist of angled sheetmetal, for example, are joined on the outside of frame 16 to side portions 17. As an example, this joint may be made in the form of a plug-type connector by means of brackets or else via additional fastening elements, such as screws or rivets.

By means of fasteners 28, firestop collar 10 can be fastened to wall 11 via fastening brackets 26 attached to side portions 17. For example, by the fact that screws are used as fasteners 28, the preload of firestop collar 10 can be adjusted by tightening these.

FIGS. 2a to 2d show a second embodiment of a firestop collar 10 in various views, wherein frame 16 is of modular construction and preferably consists of a plurality of individual parts 30, which are joined to one another by plug-type connectors 32.

In the illustrated variant, firestop collar 10 consists of three rectangular blocks 20 of optionally intumesoent material and one frame 16 of two L-shaped individual parts 30. These L-shaped individual parts 30 may also be straight strips, which in particular were bent in place at right angles, in order to form a frame 16 adapted to the opening cross section.

In one embodiment (not illustrated), frame 16 is formed from one continuous strip, which is cut to the desired length and joined at its ends.

In one embodiment (not illustrated), firestop collar 10 consists of at least two parts, wherein only one part, especially one half, may also be used as a fully effective firestop collar 10.

In particular, firestop collar 10 is dimensioned such that fire-resistance class EI 120 is achieved even for walls with a thickness of 100 mm.

In the marketplace, moreover, it is possible to offer firestop collar 10 not only as a complete set but also as individual parts thereof. In particular, frame 16 and block 20 of optionally intumescent material may be sold individually.

The invention claimed is:

1. A firestop apparatus, comprising:
   a frame comprising an opening;
   a first area of intumescent material in the frame; and
   a second area of intumescent material in the frame at a position adjacent to the first area of intumescent material, wherein the second area of intumescent material is between the frame and the first intumescent material and wherein each of the first area of intumescent material and the second area of intumescent material extends in a first direction, wherein the first and second areas of intumescent materials overlap one another and overlap the opening of the frame, in a second direction, the first and second intumescent materials extending in the first direction beyond the edge of the frame defining the opening, the opening in the frame to allow a building feature to pass through in the second direction crossing the first direction, at least one of the first area of intumescent material and the second area of intumescent material to expand in the presence of heat to contact the building feature.

2. The firestop apparatus of claim 1, wherein the frame comprises:
   at least one side portion, and
   at least one front portion extending from the at least one side portion.

3. The firestop apparatus of claim 2, wherein:
   the at least one side portion extends in the second direction, and
   the at least one front portion extends in the first direction.

4. The firestop apparatus of claim 1, wherein the first area of intumescent material comprises a first hole aligned with the opening in the frame to allow the building feature to pass through.

5. The firestop apparatus of claim 4, wherein the first hole is smaller than the opening in the frame.

6. The firestop apparatus of claim 5, wherein the second area of intumescent material comprises spaced ends corresponding to a second hole aligned with the first hole.

7. The firestop apparatus of claim 6, wherein the second hole is smaller than the opening in the frame.

8. The firestop apparatus of claim 1, wherein the frame has a modular structure.

9. The firestop apparatus of claim 1, wherein:
   the frame comprises an area for coupling to a fastener, and
   the fastener is to attach the frame to a wall or ceiling.

10. The firestop apparatus of claim 1, wherein the frame has a rectangular shape.

* * * * *